US009148877B2

(12) United States Patent
Pajukoski et al.

(10) Patent No.: US 9,148,877 B2
(45) Date of Patent: Sep. 29, 2015

(54) PROVIDING IMPROVED SCHEDULING REQUEST SIGNALING WITH ACK/NACK OR CQI

(71) Applicant: Nokia Solutions and Networks Oy, Espoo (FI)

(72) Inventors: Kari P. Pajukoski, Oulu (FI); Esa T. Tiirola, Kempele (FI)

(73) Assignee: Nokia Solutions and Networks Oy, Espoo (FI)

( * ) Notice: Subject to any disclaimer, the term of this patent is extended or adjusted under 35 U.S.C. 154(b) by 0 days.

(21) Appl. No.: 14/051,646

(22) Filed: Oct. 11, 2013

(65) Prior Publication Data
US 2014/0036842 A1 Feb. 6, 2014

Related U.S. Application Data

(63) Continuation of application No. 12/290,547, filed on Oct. 30, 2008, now Pat. No. 8,638,729.

(60) Provisional application No. 61/001,207, filed on Oct. 30, 2007.

(51) Int. Cl.
H04W 4/00 (2009.01)
H04W 72/04 (2009.01)
(Continued)

(52) U.S. Cl.
CPC ......... *H04W 72/0413* (2013.01); *H04L 1/0025* (2013.01); *H04L 1/0026* (2013.01); *H04L 1/1671* (2013.01); *H04W 28/06* (2013.01)

(58) Field of Classification Search
None
See application file for complete search history.

(56) References Cited

U.S. PATENT DOCUMENTS 7,852,883 B2  12/2010  Kwak et al. ............... 370/522
8,200,252 B2   6/2012  Lee et al. .................. 455/458
(Continued)

FOREIGN PATENT DOCUMENTS

EP  2 117 246 A1  11/2009
EP  2 109 946 B1   5/2013
(Continued)

OTHER PUBLICATIONS

"X2 downlink forwarding delay", NEC, 3GPP TSG-RAN WG2#59bis, Oct. 2007, R2-074139, 4 pgs.
(Continued)

*Primary Examiner* — Otis L Thompson, Jr.
(74) *Attorney, Agent, or Firm* — Harrington & Smith

(57) ABSTRACT

In accordance with the exemplary embodiments of the invention there is a method, executable computer program, and apparatus for determining that an acknowledgment is to be sent, and for the case where there is also a scheduling request to be sent, combining the acknowledgment with the scheduling request on a scheduling resource, else placing the acknowledgment in another resource. In accordance with another exemplary embodiment of the invention there is a method, executable computer program, and apparatus for receiving information on a scheduling resource, and determining that the information received on the scheduling resource includes an acknowledgment. Further, in accordance with the exemplary embodiments of the invention there is a method, executable computer program, and apparatus for determining that a scheduling request resource and at least one other resource are reserved for a user equipment in a same sub-frame, and based on whether a scheduling request is desired to be transmitted by the user equipment, placing at least one of an acknowledgment/negative acknowledgement and a channel quality indicator that is desired to be transmitted by the user equipment in one of the resources and leaving at least one other resource unused.

45 Claims, 9 Drawing Sheets

(51) Int. Cl.
  *H04L 1/00*    (2006.01)
  *H04L 1/16*    (2006.01)
  *H04W 28/06*   (2009.01)

(56) References Cited

U.S. PATENT DOCUMENTS

| | | | |
|---|---|---|---|
| 8,254,244 B2 | 8/2012 | Montojo et al. | 370/207 |
| 2003/0228876 A1 | 12/2003 | Hwang | 455/522 |
| 2005/0047393 A1 | 3/2005 | Liu | 370/352 |
| 2007/0133458 A1 | 6/2007 | Chandra et al. | 370/329 |
| 2007/0171849 A1 | 7/2007 | Zhang et al. | 370/310 |
| 2008/0316959 A1 | 12/2008 | Bachl et al. | 370/329 |
| 2009/0022110 A1 | 1/2009 | Muharemovic et al. | 370/336 |
| 2009/0022135 A1 | 1/2009 | Papasakellariou et al. | 370/344 |
| 2009/0046667 A1 | 2/2009 | Pelletier et al. | 370/335 |
| 2009/0109908 A1 | 4/2009 | Bertrand et al. | 370/329 |
| 2009/0316811 A1 | 12/2009 | Maeda et al. | 375/250 |

FOREIGN PATENT DOCUMENTS

| | | | |
|---|---|---|---|
| JP | 2009/049578 A | | 3/2009 |
| RU | 2305372 C2 | | 8/2007 |
| WO | WO-2004/102980 A2 | | 11/2004 |
| WO | WO-2004/110081 A1 | | 12/2004 |
| WO | WO-2005/015942 A1 | | 2/2005 |
| WO | WO-2007/008123 A1 | | 1/2007 |
| WO | WO-2007/044414 A1 | | 4/2007 |
| WO | WO-2007/081564 A2 | | 7/2007 |
| WO | WO 2007/100547 A2 | | 9/2007 |
| WO | WO-2007/130324 A2 | | 11/2007 |
| WO | WO-2007/130324 A3 | | 11/2007 |
| WO | WO-2009/022866 A1 | | 2/2009 |

OTHER PUBLICATIONS

"Multiplexing of Scheduling Request and ACK/NACK and/or CQI", Nokia Siemens Networks, 3GFP TSG RAN WG1#49bis, R1-073011, 3 pgs.

"Handling NAS message during HO", Alcatel-Lucent, 3 GPP TSG RAN WG2 #59bis, Oct. 2007, R2-074333, 2 pgs.

3GPP TSG RAN WG1 #48bis, R1-071662, St. Julians, Malta, Mar. 26-30, 2007, Nokia Siemens, "Uplink Scheduling Request for LTE", 4 pgs.

"Data-non-associated control signal transmission without UL data", Nokia Siemens, 3GPP TSG RAN WG1 Meeting #48bis, R1-07167.6, Mar. 2007, 6 pgs.

"Multiplexing of Scheduling Request Indicator", Huawei, 3GPP TSG-RAN-WG1 Meeting #49bis, R1-072895, Jun. 2007, 4 pgs.

"Multiplexing the Scheduling Request in the Uplink", Alcatel-Lucent, 3GPP TSG-RAN WG1 #49bis, R1-073066, Jun. 2007, 4 pgs.

"Proposed Scheduling Request (SR) structure and multiplexing with PUCCH", LG Electronics, 3GPP TSG RAN WG1 #50, R1073485, Aug. 2007, 6 pgs.

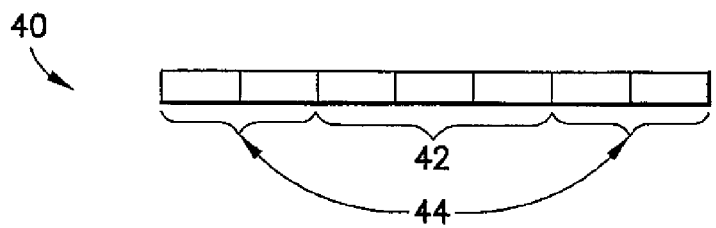
FIG.1
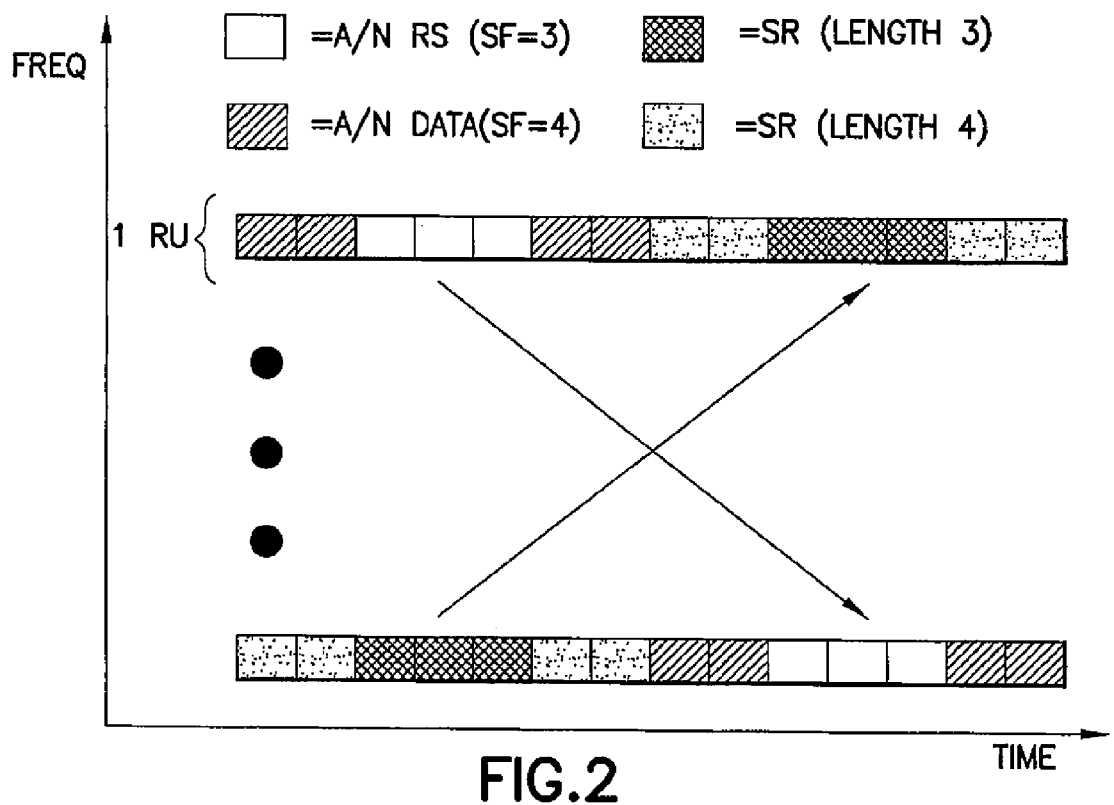
FIG.2
| CYCLIC CHIFT | BLOCK COVER CODE | | |
| --- | --- | --- | --- |
| INSIDE LB | 0 | 1 | 2 |
| 0 | 0 | | 17 |
| 1 | | 6 | |
| 2 | 1 | | 12 |
| 3 | | 7 | |
| 4 | 2 | | 13 |
| 5 | | 8 | |
| 6 | 3 | | 14 |
| 7 | | 9 | |
| 8 | 4 | | 15 |
| 9 | | 10 | |
| 10 | 5 | | 16 |
| 11 | | 11 | |
FIG.3

| CYCLIC SHIFT INSIDE LB | ADDITIONAL COVE CODE [1,1] | | |
|---|---|---|---|
| | BLOCK COVER CODE | | |
| | 0 | 1 | 2 |
| 0 | 0 | 23 | 34 |
| 1 | 1 | 12 | 35 |
| 2 | 2 | 13 | 24 |
| 3 | 3 | 14 | 25 |
| 4 | 4 | 15 | 26 |
| 5 | 5 | 16 | 27 |
| 6 | 6 | 17 | 28 |
| 7 | 7 | 18 | 29 |
| 8 | 8 | 19 | 30 |
| 9 | 9 | 20 | 31 |
| 10 | 10 | 21 | 32 |
| 11 | 11 | 22 | 33 |

| CYCLIC SHIFT INSIDE LB | ADDITIONAL COVE CODE [1,−1] | | |
|---|---|---|---|
| | BLOCK COVER CODE | | |
| | 0 | 1 | 2 |
| 0 | 36 | 59 | 70 |
| 1 | 37 | 48 | 71 |
| 2 | 38 | 49 | 60 |
| 3 | 39 | 50 | 61 |
| 4 | 40 | 51 | 62 |
| 5 | 41 | 52 | 63 |
| 6 | 42 | 53 | 64 |
| 7 | 43 | 54 | 65 |
| 8 | 44 | 55 | 66 |
| 9 | 45 | 56 | 67 |
| 10 | 46 | 57 | 68 |
| 11 | 47 | 58 | 69 |

FOR THE CASE WHERE THE USER EQUIPMENT DESIRES TO TRANSMIT A SCHEDULING REQUEST AND TRANSMIT AN ACKNOWLEDGMENT/NEGATIVE ACKNOWLEDGMENT, TRANSMITTING THE ACKNOWLEDGMENT/NEGATIVE ACKNOWLEDGMENT WITH THE SCHEDULING REQUEST ON THE SCHEDULING REQUEST RESOURCE AND LEAVING THE AT LEAST ONE OTHER RESOURCE UNUSED; OR

FOR THE CASE WHERE THE USER EQUIPMENT DOES NOT DESIRE TO TRANSMIT A SCHEDULING REQUEST AND DOES DESIRE TO TRANSMIT AN ACKNOWLEDGMENT/NEGATIVE ACKNOWLEDGMENT, TRANSMITTING THE ACKNOWLEDGMENT/NEGATIVE ACKNOWLEDGMENT ON THE AT LEAST ONE OTHER RESOURCE AND LEAVING THE SCHEDULING REQUEST RESOURCE UNUSED

FIG.9B

PROVIDING IMPROVED SCHEDULING REQUEST SIGNALING WITH ACK/NACK OR CQI

CROSS-REFERENCE TO RELATED APPLICATIONS

This patent application is a continuation of U.S. patent application Ser. No. 12/290,547, filed on Oct. 30, 2008, which claims priority under 35 U.S.C. §119(e) from Provisional Patent Application No. 61/001,207, filed Oct. 30, 2007, the disclosure of which is incorporated by reference herein in its entirety.

TECHNICAL HELD

The exemplary and non-limiting embodiments of this invention relate generally to wireless communication systems, apparatus, methods and computer program products and, more specifically, relate to improved signaling of a scheduling request in conjunction with an acknowledgement or channel quality indicator.

BACKGROUND

This section is intended to provide a background or context to the invention that is recited in the claims. The description herein may include concepts that could be pursued, but are not necessarily ones that have been previously conceived or pursued. Therefore, unless otherwise indicated herein, what is described in this section is not prior art to the description and claims in this application and is not admitted to be prior art by inclusion in this section.

The following abbreviations are utilized herein:
3GPP third generation partnership project
ACK acknowledgement
BPSK binary phase-shift keying
CAZAC constant amplitude zero autocorrelation
CM cubic metric
CQI channel quality indicator
DNA data-non-associated
DL downlink (Node B to UE)
DL-SCH downlink shared channel
eNode B evolved Node B (LTE base station)
E-UTRAN evolved universal terrestrial radio access network
LTE long term evolution of UTRAN (E-UTRAN)
NACK negative acknowledgement
Node B base station
PAR peak-to-average ratio
PUCCH physical uplink control channel
PUSCH physical uplink shared channel
QPSK quadrature phase-shift keying
RACH random access channel
RAN radio access network
RRC radio resource control
RS reference signal
SF spreading factor
SR scheduling request
TSG technical specifications group
TTI transmission time interval
UE user equipment, such as a mobile station or mobile terminal
UL uplink (UE to Node B)
UTRAN universal terrestrial radio access network
VoIP voice over internet protocol
WG working group The 3GPP has been working on the standardization of LTE (E-UTRAN). In the absence of UL data, data-non-associated control signals (e.g., ACK/NACK, periodic CQI) are transmitted on the PUCCH. Furthermore, it has been decided that:
(a) ACK/NACK (only) signals are transmitted utilizing modulated $CAZAC_1$ sequences (coherent): BPSK is used for 1-bit ACK/NACK and QPSK for 2-bit ACK/NACK. Block-wise spreading with SF=3/SF=4 (pilot/data) is applied for the modulated CAZAC sequences.

[1] The applied sequences may not be true CAZAC but computer searched Zero-Autocorrelation (ZAC) sequences. The same sequences are applied as reference signals with bandwidth allocation of one resource block.

(b) Periodic CQI (and combinations of CQI and ACK/NACK) is also transmitted utilizing modulated CAZAC sequences. Block-spreading is not used.

In the 3GPP TSG RAN WG1 meeting #47bis in Sorrento, it was agreed that a non-contention based SR mechanism for time synchronized users will be supported.

The basic principles for SR multiplexing were agreed to in the 3GPP TSG RAN WG1 meeting #50bis in Shanghai. Reference in this regard may further be made to R2-074333, 3GPP TSG-RAN WG2#59bis, Alcatel-Lucent, "Handling NAS messages during HO," Oct. 8-12, 2007, Shanghai, China.

In the Shanghai meeting, the following was also decided:
(i) There are two sizes of the SR corresponding to two states. Either the UE requests to be scheduled or (in case of no transmission) the UE does not request to be scheduled.
(ii) On-off keying based on ACK/NACK design: The length 7 sequence is split into two orthogonal sequences of length 3 and length 4. FIG. 1 shows the length 7 sequence 40 with two constituent orthogonal sequences 42, 44 of lengths 3 and 4, respectively.
(iii) There will be compatibility with ACK/NACK transmissions from different UEs.
(iv) Different resources corresponding to a cyclic shift and an orthogonal cover code can be assigned for scheduling requests and ACK/NACK.

It is noted that the ACK/NACK signaled on the UL is related to DL-SCH (Physical Downlink Shared Channel, PDSCH). In the case where the UE has no data to transmit (i.e., on the UL), the ACK/NACK is signaled on the PUCCH. When the UE has UL data to transmit, the ACK/NACK is signaled on the PUSCH.

SUMMARY

In an exemplary aspect of the invention, there is a method comprising determining that an acknowledgment is to be sent, and for the case where there is also a scheduling request to be sent, combining the acknowledgment with the scheduling request on a scheduling resource, else placing the acknowledgment in another resource.

In an exemplary aspect of the invention, there is a computer readable medium encoded with a computer program executable by a processor to perform actions comprising determining that an acknowledgment is to be sent, and for the case where there is also a scheduling request to be sent, combining the acknowledgment with the scheduling request on a scheduling resource, else placing the acknowledgment in another resource.

In an exemplary aspect of the invention, there is an apparatus comprising a processor configured to determine that an acknowledgment is to be sent, and the processor further configured to, for the case where there is also a scheduling request to be sent, combine the acknowledgment with the scheduling request on a scheduling resource, else placing the acknowledgment in another resource.

In an exemplary aspect of the invention, there is an apparatus comprising means for determining that an acknowledgment is to be sent, and means for, in the case where there is also a scheduling request to be sent, combining the acknowledgment with the scheduling request on a scheduling resource, else placing the acknowledgment in another resource.

In another exemplary aspect of the invention, there is a method comprising receiving information on a scheduling resource, and determining that the information received on the scheduling resource comprises an acknowledgment.

In another exemplary aspect of the invention, there is a computer readable medium encoded with a computer program executable by a processor to perform actions comprising receiving information on a scheduling resource, and determining that the information received on the scheduling resource comprises an acknowledgment.

In still another exemplary aspect of the invention, there is an apparatus comprising a receiver, the receiver configured to receive information on a scheduling resource, and a processor configured to determine that the information received on the scheduling resource comprises an acknowledgment.

In yet another exemplary aspect of the invention, there is an apparatus comprising means for receiving information on a scheduling resource, and means for determining that the information received on the scheduling resource comprises an acknowledgment.

In still another exemplary aspect of the invention there is a method comprising determining that a scheduling request resource and at least one other resource are reserved for a user equipment in a same sub-frame, and based on whether a scheduling request is desired to be transmitted by the user equipment, placing at least one of an acknowledgment/negative acknowledgement and a channel quality indicator that is desired to be transmitted by the user equipment in one of the resources and leaving at least one other resource unused.

BRIEF DESCRIPTION OF THE DRAWINGS

In the attached Drawing Figures:

FIG. 1 shows a length 7 sequence having two constituent orthogonal sequences of lengths 3 and 4;

FIG. 2 illustrates an example of ACK/NACK and SR resource assignments for UL transmissions on the PUCCH;

FIG. 3 shows an example of ACK/NACK resources configured for 18 parallel ACK/NACK channels;

FIG. 4 shows an example of SR resources configured for 72 parallel SR channels;

DETAILED DESCRIPTION

Figure 5:
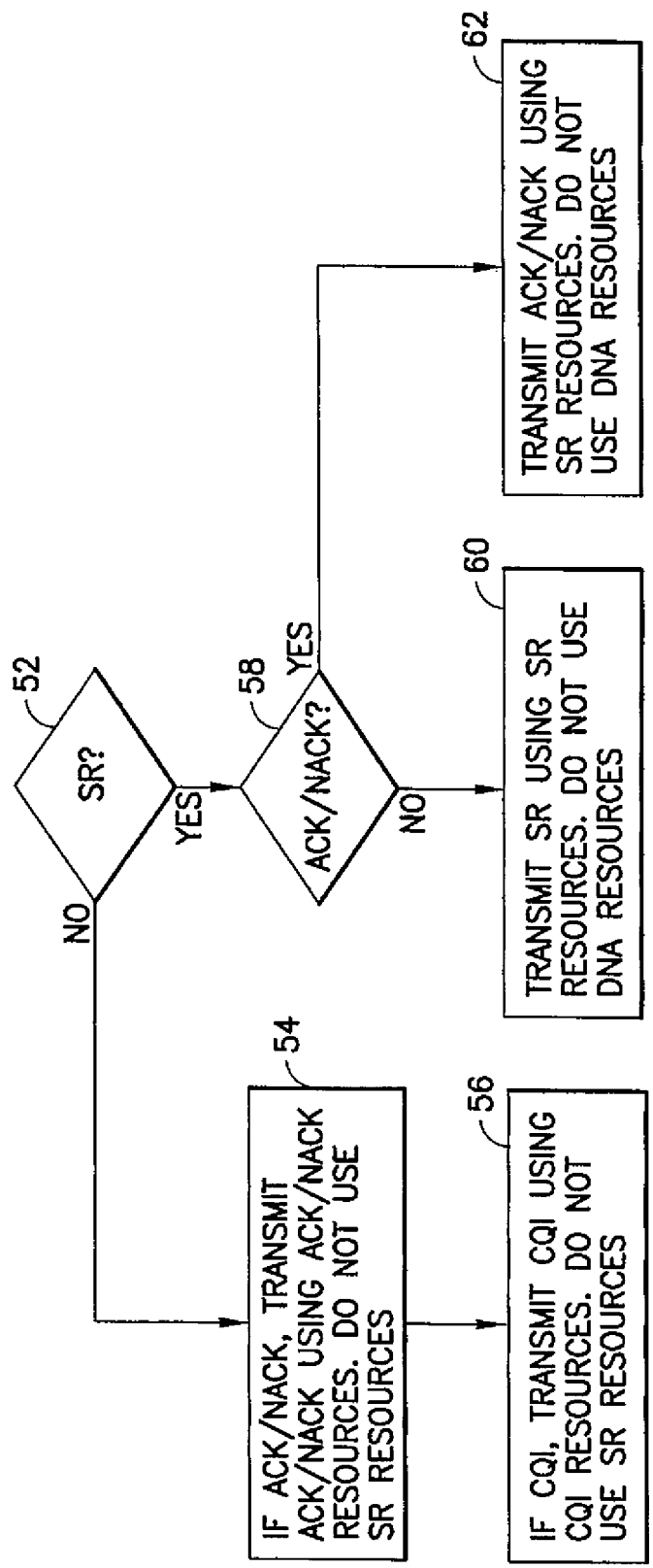
FIG. 5 shows a flowchart illustrating one non-limiting example of a method for practicing the exemplary embodiments of this invention.

Consider a multiplexing case where data-non-associated control signals, such as ACK/NACK (e.g., DL ACK/NACK) and/or periodic CQI, exist simultaneously with an UL SR. Further assume that the UE is not transmitting UL data since separate SR/buffer status reporting principles will be used when the UE has scheduled UL data transmission on the PUSCH. As noted above, in the absence of UL data data-non-associated control signals are transmitted on the PUCCH.

To date, SR decisions made in 3GPP RAN1 only cover the case where a SR is transmitted standalone. However, it may occur that the SR is transmitted with additional data-non-associated control signals, such as ACK/NACK and/or periodic CQI (e.g., ACK/NACK+SR, periodic CQI+SR, periodic CQI+ACK/NACK+SR). Various complications may arise in such cases.

FIG. 2 illustrates an example of ACK/NACK and SR resource assignments for UL transmissions on the PUCCH. In FIG. 2, ACK/NACK and SR have been configured for different frequency-hopping radio resources. FIG. 3 shows an example of ACK/NACK resources configured for 18 parallel ACK/NACK channels. FIG. 4 shows an example of SR resources configured for 72 parallel SR channels.

Each UE has certain code resources allocated to two different channels: one UE may occupy, for example, the eighth (8th) ACK/NACK resource and the twenty-eighth (28th) SR resource, respectively (see FIGS. 3 and 4).

One problem with the considered signaling combinations is related to the single-carrier property of LTE UL—it is not possible to transmit signals via multiple frequency bands (see FIG. 2) such that the beneficial low PAR properties of single-carrier transmission are maintained. However, due to the lack of a common pilot in the UL direction, it would not be economical to transmit two low rate control signals (e.g., SR+ACK/NACK and/or CQI) via two separate clusters (or via four clusters if SR and ACK/NACK and/or CQI have been configured into non-overlapping frequency resources).

There are some prior art techniques being discussed in RAN1 to avoid the multicarrier/multi-cluster transmission in the presence of a SR:

(a) One technique is to prioritize a predetermined signaling type (e.g., ACK/NACK instead of SR or SR instead of CQI). This means that when two signaling types exist in a same subframe, only the signaling type with the higher priority is transmitted whereas the lower priority signaling is not transmitted at all. One problem with this approach is the increased SR (or CQI) delay. This delay may be significant, for example, in a VoIP application.

(b) Periodic CQI+SR: The idea would be to arrange the periodic CQI reporting and SR signaling in such a way that they do not appear in a same subframe. One problem with this approach is that the arrangement will introduce limitations for either SR or CQI signaling. This may also be difficult to arrange as the periodicity of SR and CQI may not be the same.

(c) ACK/NACK+SR: It is possible to avoid this situation by introducing certain scheduler limitations for UEs being allocated for the given SR resource (i.e., do not allocate DL data for a time resource which will cause an ACK/NACK transmission to occur for a TTI in which the UE has simultaneous SR transmission).

(d) It would also be possible to develop a special multiplexing scheme for different alternatives (e.g., different schemes for ACK/NACK+SR, periodic CQI+SR, ACK/NACK+periodic CQI+SR). Problems with this approach are related to link performance (modulation method) and/or resource allocation (multicode method, sequence selection method). Reference with regard to this technique may be made to commonly-owned U.S. provisional patent application No. 60/936,033, "Multiplexing of Scheduling Request and ACK/NACK and/or CQI Transmitted on PUCCH" by Tiirola et al. filed on Jun. 18, 2007. Further reference in this regard may be made to R2-074139, 3GPP TSG-RAN WG2#59bis, NEC, "X2 downlink forwarding delay," Oct. 8-12, 2007, Shanghai, China.

Exemplary embodiments of the invention provide improved techniques for signaling a SR with an ACK/NACK and/or CQI. In some exemplary embodiments, different multiplexing procedures are provided for cases with positive SR than for cases with negative SR. In accordance with the 3GPP TSG-RAN WG1#50bis Shanghai decisions, when the SR is transmitted standalone, only positive SRs are signaled (i.e., there is no transmission for negative SR).

In one, non-limiting exemplary embodiment of the invention:

(i) For negative SR, the ACK/NACK and/or CQI are signaled using original ACK/NACK (ACK/NACK PUCCH) and/or CQI resources (CQI PUCCH).
(ii) For positive SR, the ACK/NACK signal is transmitted using the SR resources (SR PUCCH). Transmission of the ACK/NACK on the SR resource(s) can be performed in a similar way to when ACK/NACK is transmitted on the ACK/NACK resource (unmodulated sequence 1 and modulated sequence 2 or unmodulated sequence 1 and unmodulated sequence 2). In this case, the ACK/NACK resource (ACK/NACK PUCCH) is left unused.
(iii) For positive SR without a simultaneous ACK/NACK signal, the SR signal is transmitted using the original SR resource(s), SR PUCCH. The simultaneous CQI is dropped (i.e., not transmitted) and the CQI resource(s), (CQI PUCCH) is left unused.

In such a manner, simultaneous transmission of ACK/NACK and (positive) SR is supported whereas there is no provision for simultaneous transmission of (positive) SR and CQI.

It is briefly noted that, as utilized herein, "positive SR" signifies that the UE desires to transmit a SR (e.g., to a Node B). Similarly, "negative SR" indicates that the UE does not desire to transmit a SR (e.g., to a Node B). Any reference to "resource" should be construed as covering a single resource or multiple resources assigned for the specified signaling.

With a negative SR, it is possible to signal the ACK/NACK and/or CQI using the original resources allocated for ACK/NACK or CQI, respectively. The SR resource(s) is left (SR PUCCH) unused. Thus, the following hold: If there is a negative SR and an ACK/NACK, transmit the ACK/NACK using only the original ACK/NACK resource(s), ACK/NACK PUCCH. If there is a negative SR and a CQI (e.g., periodic CQI), transmit the CQI using only the original CQI resource(s), CQI PUCCH. If there is a negative SR and both ACK/NACK and a CQI, transmit the ACK/NACK and CQI using only the original ACK/NACK and CQI resources, CQI PUCCH respectively.

As noted above, with a positive SR, simultaneous transmission of ACK/NACK and SR is supported whereas there is no support for simultaneous transmission of CQI and SR. Simultaneous transmission of ACK/NACK and positive SR is performed using the SR resource(s), SR PUCCH. Thus, the following procedures are applied:

If there is a positive SR and an ACK/NACK, signal the ACK/NACK using the existing SR resource(s), SR PUCCH. The ACK/NACK resource(s), ACK/NACK PUCCH, are left unused. The ACK/NACK can be transmitted similarly to when it is transmitted on its own resource (e.g., unmodulated sequence 1, BPSK/QPSK-modulated sequence 2).

If there is a positive SR and a CQI (e.g., periodic CQI), the SR is prioritized over the CQI. That is, transmit the SR using only the original SR resource (e.g., on the PUCCH). The CQI resource, CQI PUCCH is left unused.

If there is a positive SR and both ACK/NACK and CQI, the ACK/NACK is signaled using only the original SR resource (e.g., on the PUCCH). The CQI resource, CQI PUCCH is left unused and the CQI is not transmitted. The ACK/NACK can be transmitted similarly to when it is transmitted on its own resource (e.g., unmodulated sequence 1, BPSK/QPSK-modulated sequence 2).

On the Node B side, the Node B is responsible for the UL/DL resource allocation (e.g., for CQI, DL data and ACK/NACK, SR). Therefore, the Node B can receive the ACK/NACK, CQI and SR from the various resources, taking into account the different UE operation in light of positive or negative SR.

In further exemplary embodiments, the Node B can modify the above-stated prioritizations, for example, using RRC signaling (e.g., cell-specific, UE-specific). In such a manner, and as a non-limiting example, the Node B could modify the prioritization such that CQI is prioritized over ACK/NACK.

FIG. 5 shows a flowchart illustrating one non-limiting example of a method for practicing the exemplary embodiments of this invention. In box 52, it is determined whether there is a positive SR ("YES") or a negative SR ("NO"). If there is a negative SR, the method proceeds to boxes 54 and 56. In box 54, if there is an ACK/NACK (w/o CQI), the ACK/NACK is transmitted using ACK/NACK resources and the SR resources are unused. In box 56, if there is a CQI (with or without ACK/NACK), the CQI (or CQI+ACK/NACK) is transmitted using CQI resources, CQI PUCCH, and the SR resources (and ACK/NACK PUCCH) are unused. If there is a positive SR ("YES" for box 52), the method proceeds to box 58. In box 58, it is determined whether ACK/NACK is present ("YES") or not ("NO"). If ACK/NACK is not present ("NO" for box 58), then in box 60 the SR is transmitted using the SR resources and the additional resource which may be data-non-associated (DNA) resources, such as ACK/NACK PUCCH and CQI PUCCH are unused. No CQI is transmitted, regardless of whether or not it is present. If ACK/NACK is present ("YES" for box 58), then in box 62 the ACK/NACK is transmitted using the SR resources and the DNA resources, such as ACK/NACK PUCCH and CQI PUCCH are unused. No CQI is transmitted, regardless of whether or not it is present.

Figure 6:
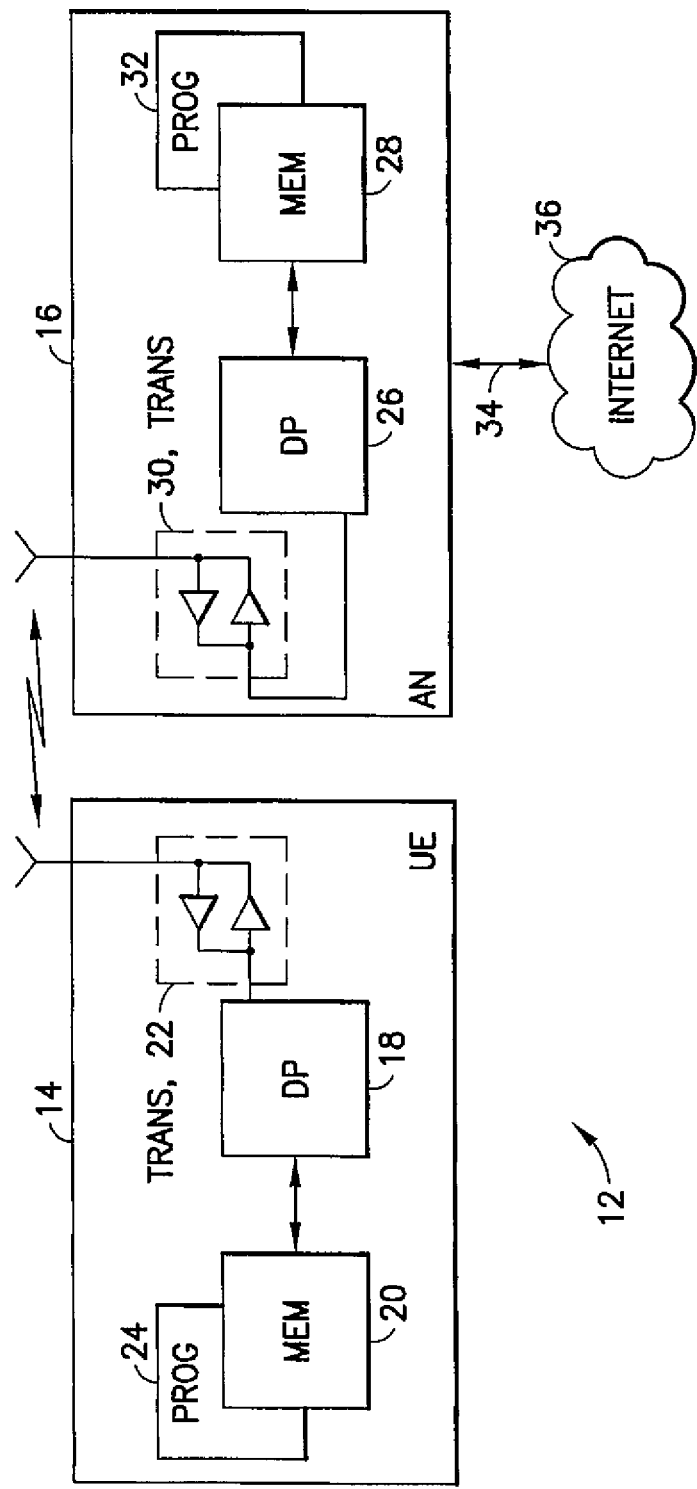
FIG. 6 shows a simplified block diagram of various electronic devices that are suitable for use in practicing the exemplary embodiments of this invention.

Reference is made to FIG. 6 for illustrating a simplified block diagram of various electronic devices that are suitable for use in practicing the exemplary embodiments of this invention. In FIG. 6, a wireless network 12 is adapted for communication with a user equipment (UE) 14 via an access node (AN) 16. The UE 14 includes a data processor (DP) 18, a memory (MEM) 20 coupled to the DP 18, and a suitable RF transceiver (TRANS) 22 (having a transmitter (TX) and a receiver (RX)) coupled to the DP 18. The MEM 20 stores a program (PROG) 24. The TRANS 22 is for bidirectional wireless communications with the AN 16. Note that the TRANS 22 has at least one antenna to facilitate communication.

The AN 16 includes a data processor (DP) 26, a memory (MEM) 28 coupled to the DP 26, and a suitable RF transceiver (TRANS) 30 (having a transmitter (TX) and a receiver (RX)) coupled to the DP 26. The MEM 28 stores a program (PROG) 32. The TRANS 30 is for bidirectional wireless communications with the UE 14. Note that the TRANS 30 has at least one antenna to facilitate communication. The AN 16 is coupled via a data path 34 to one or more external networks or systems, such as the internet 36, for example.

At least one of the PROGs 24, 32 is assumed to include program instructions that, when executed by the associated DP, enable the electronic device to operate in accordance with the exemplary embodiments of this invention, as discussed herein.

In general, the various exemplary embodiments of the UE 14 can include, but are not limited to, user equipments, terminals, mobile phones, cellular phones, personal digital assistants (PDAs) having wireless communication capabilities, portable computers having wireless communication capabilities, image capture devices such as digital cameras having wireless communication capabilities, gaining devices having wireless communication capabilities, music storage and playback appliances having wireless communication capabilities, Internet appliances permitting wireless Internet access and browsing, as well as portable units or terminals that incorporate combinations of such functions.

The embodiments of this invention may be implemented by computer software executable by one or more of the DPs 18, 26 of the UE 14 and the AN 16, or by hardware, or by a combination of software and hardware.

The MEMs 20, 28 may be of any type suitable to the local technical environment and may be implemented using any suitable data storage technology, such as semiconductor-based memory devices, magnetic memory devices and systems, optical memory devices and systems, fixed memory and removable memory, as non-limiting examples. The DPs 18, 26 may be of any type suitable to the local technical environment, and may include one or more of general purpose computers, special purpose computers, microprocessors, digital signal processors (DSPs) and processors based on a multi-core processor architecture, as non-limiting examples.

By utilizing exemplary embodiments of the invention, unlike with other prior art techniques supporting simultaneous transmission of ACK/NACK and SR, SR, ACK/NACK and CQI performance can be maintained with very little, if any, change.

In many cases, it may be possible to configure periodic CQI and periodic SR into different subframes. In such cases, the performance degradation caused by dropping CQI is estimated to be very marginal.

Furthermore, accepted modulation options may be utilized in conjunction with exemplary embodiments of the invention. That is, there is no need to specify separate modulation or multiplexing options for positive SR versus negative SR. Existing data-non-associated signaling can be maintained as similar as possible with both positive SR and negative SR. Furthermore, no changes are needed for CM properties.

Below are provided further descriptions of non-limiting, exemplary embodiments. The below-described exemplary embodiments are separately numbered for clarity and identification. This numbering should not be construed as wholly separating the below descriptions since various aspects of one or more exemplary embodiments may be practiced in conjunction with one or more other aspects or exemplary embodiments.

Figure 7:
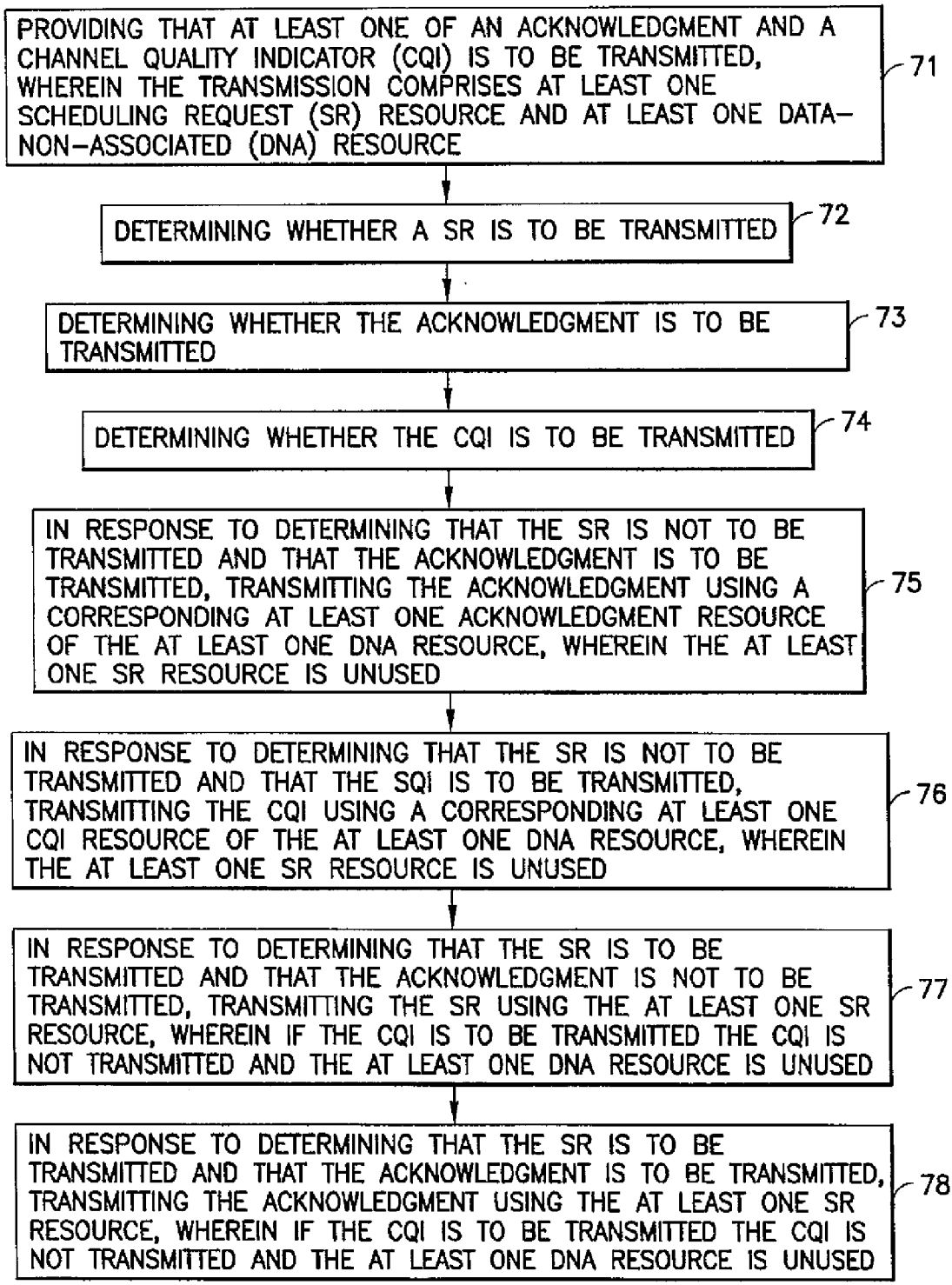
FIG. 7 depicts a flowchart illustrating another non-limiting example of a method for practicing the exemplary embodiments of this invention.

In one non-limiting, exemplary embodiment, and as illustrated in FIG. 7, a method includes: providing that at least one of an acknowledgement and a channel quality indicator (CQI) is to be transmitted, wherein the transmission comprises at least one scheduling request (SR) resource (SR PUCCH) and at least one additional resource that can be a data-non-associated (DNA) resource, such as ACK/NACK PUCCH or CQI PUCCH (box 71); determining whether a SR is to be transmitted (box 72); determining whether the acknowledgement is to be transmitted (box 73); determining whether the CQI is to be transmitted (box 74); in response to determining that the SR is not to be transmitted and that the acknowledgement is to be transmitted, transmitting the acknowledgement using a corresponding at least one acknowledgement resource of the at least one additional resource such as a DNA resource, wherein the at least one SR resource is unused (box 75); in response to determining that the SR is not to be transmitted and that the CQI (or CQI+ACK/NACK) is to be transmitted, transmitting the CQI (or CQI+ACK/NACK) using a corresponding at least one CQI resource of the at least one additional resource such as a DNA resource, wherein the at least one SR resource is unused (box 76); in response to determining that the SR is to be transmitted and that the acknowledgement is not to be transmitted, transmitting the SR using the at least one SR resource, wherein if the CQI is to be transmitted the CQI is not transmitted and the at least one additional resource such as the DNA resource is unused (box 77); and in response to determining that the SR is to be transmitted and that the acknowledgement is to be transmitted, transmitting the acknowledgement using the at least one SR resource, wherein if the CQI is to be transmitted the CQI is not transmitted and the at least one additional resource such as the DNA resource is unused (box 78).

A method as above, wherein a periodic CQI transmission and a periodic SR transmission are configured into different subframes. A method as in any above, wherein transmissions are transmitted on a PUCCH. A method as in any above, wherein transmissions are transmitted on an UL. A method as in any above, wherein if transmitted the acknowledgement comprises an unmodulated sequence 1, BPSK/QPSK-modulated sequence 2. A method as in any above, wherein the method is implemented by a UE or terminal. A method as in any above, wherein the method is implemented within a wireless communication network. A method as in any above, wherein the method is implemented within an E-UTRAN. A method as in any above, wherein the method is implemented by a computer program. A method as in any above, wherein the method is implemented by a processor of a user equipment.

In another non-limiting, exemplary embodiment, a computer program product comprises program instructions embodied on a tangible computer-readable medium. Execution of the program instructions results in operations comprising: providing that at least one of an acknowledgement and a channel quality indicator (CQI) is to be transmitted, wherein the transmission comprises at least one scheduling request (SR) resource and at least one additional resource such as a data-non-associated (DNA) resource, such as ACK/NACK PUCCH or CQI PUCCH; determining whether a SR is to be transmitted; determining whether the acknowledgement is to be transmitted; determining whether the CQI is to be transmitted; in response to determining that the SR is not to be transmitted and that the acknowledgement is to be transmitted, transmitting the acknowledgement using a corresponding at least one acknowledgement resource of the at least one additional resource such as a DNA resource, wherein the at least one SR resource is unused; in response to determining that the SR is not to be transmitted and that the CQI (or CQI+ACK/NACK) is to be transmitted, transmitting the CQI (or CQI+ACK/NACK) using a corresponding at least one CQI resource of the at least one additional resource such as a DNA resource, wherein the at least one SR resource is unused; in response to determining that the SR is to be transmitted and that the acknowledgement is not to be transmitted, transmitting the SR using the at least one SR resource, wherein if the CQI is to be transmitted the CQI is not transmitted and the at least one additional resource such as a DNA resource is unused; and in response to determining that the SR is to be transmitted and that the acknowledgement is to be transmitted, transmitting the acknowledgement using the at least one SR resource, wherein if the CQI is to be transmitted the CQI is not transmitted and the at least one additional resource such as a DNA resource is unused.

A computer program as above, wherein a periodic CQI transmission and a periodic SR transmission are configured into different sub-frames. A computer program as in any above, wherein transmissions are transmitted on a PUCCH. A computer program as in any above, wherein transmissions are transmitted on an UL. A computer program as in any above, wherein if transmitted the acknowledgement comprises an unmodulated sequence 1, BPSK/QPSK-modulated sequence 2. A computer program as in any above, wherein the method is implemented by a UE or terminal. A computer program as in any above, wherein the computer program is implemented within a wireless communication network. A computer program as in any above, wherein the computer program is implemented within an E-UTRAN.

In another non-limiting, exemplary embodiment, an apparatus comprising: a transceiver configured to transmit at least one of an acknowledgement and a channel quality indicator (CQI), wherein the transmission comprises at least one scheduling request (SR), SR PUCCH resource and at least one additional resource which may be a data-non-associated (DNA) resource, such as ACK/NACK PUCCH or CQI PUCCH; and a processor configured to determine whether a SR is to be transmitted, to determine whether the acknowledgement is to be transmitted, and to determine whether the CQI is to be transmitted, wherein in response to the processor determining that the SR is not to be transmitted and that the acknowledgement is to be transmitted, the transceiver is configured to transmit the acknowledgement using a corresponding at least one acknowledgement resource of the at least one additional resource such as a DNA resource and wherein the at least one SR resource is unused, wherein in response to the processor determining that the SR is not to be transmitted and that the CQI is to be transmitted, the transceiver is configured to transmit the CQI using a corresponding at least one CQI resource of the at least one additional resource such as a DNA resource and wherein the at least one SR resource is unused, wherein in response to the processor determining that the SR is to be transmitted and that the acknowledgement is not to be transmitted, the transceiver is configured to transmit the SR using the at least one SR resource and wherein if the CQI is to be transmitted the CQI is not transmitted and the at least one additional resource such as a DNA resource is unused, wherein in response to the processor determining that the SR is to be transmitted and that the acknowledgement is to be transmitted, the transceiver is configured to transmit the acknowledgement using the at least one SR resource and wherein if the CQI is to be transmitted the CQI is not transmitted and the at least one additional resource such as a DNA resource is unused.

An apparatus as above, wherein a periodic CQI transmission and a periodic SR transmission are configured by the processor into different sub-frames. An apparatus as in any above, wherein transmissions are transmitted by the transceiver on a PUCCH. An apparatus as in any above, wherein transmissions are transmitted by the transceiver on an UL. An apparatus as in any above, wherein if transmitted by the transceiver the acknowledgement comprises an unmodulated sequence 1, BPSK/QPSK-modulated sequence 2. An apparatus as in any above, wherein the apparatus comprises a UE or terminal. An apparatus as in any above, wherein the apparatus comprises a node of a wireless communication network.

An apparatus as in any above, wherein the apparatus comprises a node of an E-UTRAN.

In another non-limiting, exemplary embodiment, an apparatus comprising: means for transmitting at least one of an acknowledgement and a channel quality indicator (CQI), wherein the transmission comprises at least one scheduling request (SR) resource and at least one additional resource which may be a data-non-associated (DNA) resource, such as ACK/NACK PUCCH or CQI PUCCH; means for determining whether a SR is to be transmitted; means for determining whether the acknowledgement is to be transmitted; and means for determining whether the CQI is to be transmitted, wherein in response to the processor determining that the SR is not to be transmitted and that the acknowledgement is to be transmitted, the means for transmitting is further for transmitting the acknowledgement using a corresponding at least one acknowledgement resource of the at least one additional resource such as a DNA resource and wherein the at least one SR resource is unused, wherein in response to the processor determining that the SR is not to be transmitted and that the CQI is to be transmitted, the means for transmitting is further for transmitting the CQI using a corresponding at least one CQI resource of the at least one additional resource such as a DNA resource and wherein the at least one SR resource is unused, wherein in response to the processor determining that the SR is to be transmitted and that the acknowledgement is not to be transmitted, the means for transmitting is further for transmitting the SR using the at least one SR resource and wherein if the CQI is to be transmitted the CQI is not transmitted and the at least one additional resource such as a DNA resource is unused, wherein in response to the processor determining that the SR is to be transmitted and that the acknowledgement is to be transmitted, the means for transmitting is further for transmitting the acknowledgement using the at least one SR resource and wherein if the CQI is to be transmitted the CQI is not transmitted and the at least one additional resource such as a DNA resource is unused.

An apparatus as above, wherein the means for transmitting comprises a transmitter and the means for determining whether the SR is to be transmitted, the means for determining whether the acknowledgement is to be transmitted and the means for determining whether the CQI is to be transmitted comprise a processor.

Figure 8:
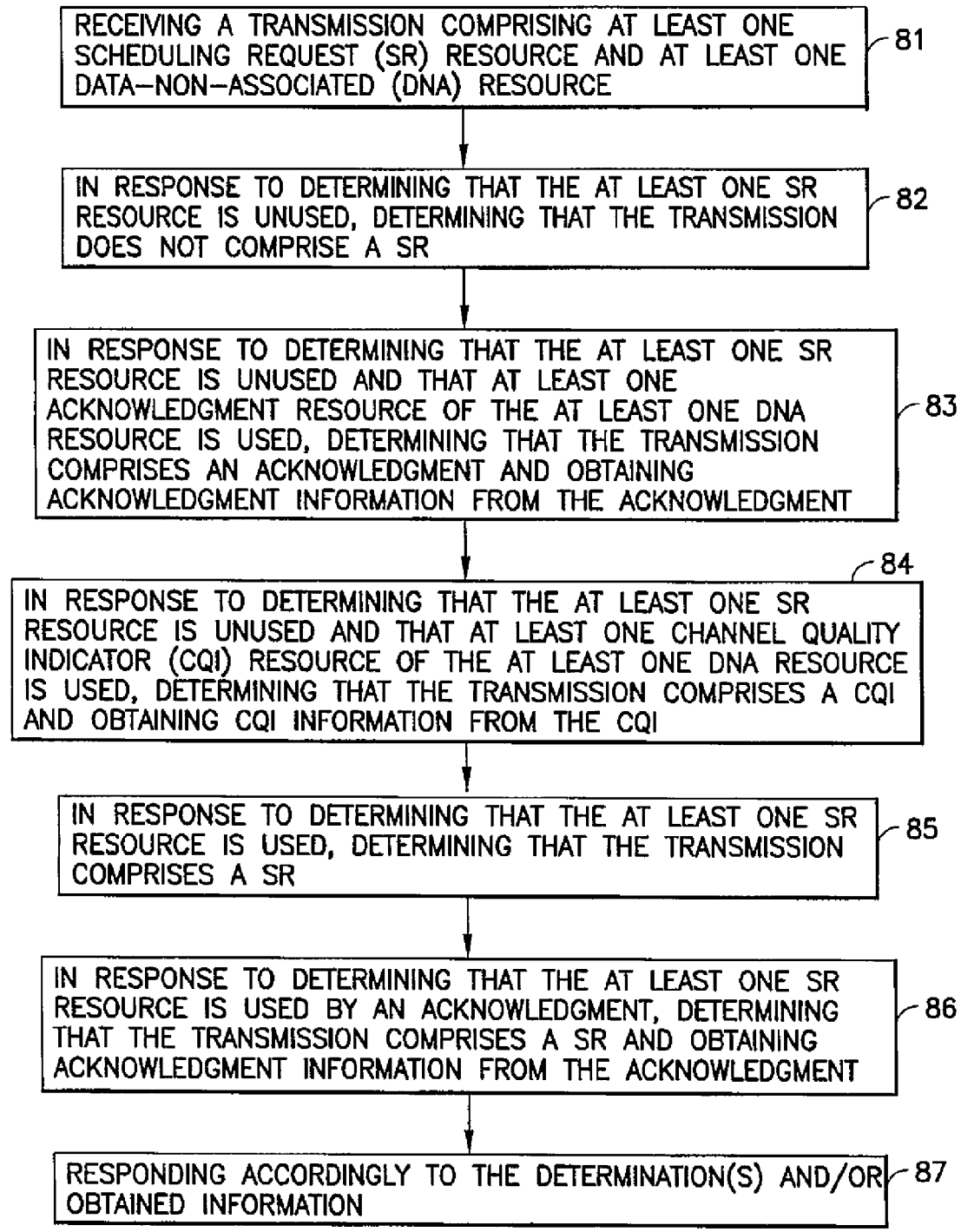
FIG. 8 depicts a flowchart illustrating another non-limiting example of a method for practicing the exemplary embodiments of this invention.

In another non-limiting, exemplary embodiment, and as illustrated in FIG. 8, a method includes: receiving a transmission comprising at least one scheduling request (SR) resource and at least one other resource which may be a data-non-associated (DNA) resource (box 81); such as ACK/NACK PUCCH or CQI PUCCH; in response to determining that the at least one SR resource is unused, determining that the transmission does not comprise a SR (box 82); in response to determining that the at least one SR resource is unused and that at least one acknowledgement resource of the at least one other resource such as a DNA resource is used, determining that the transmission comprises an acknowledgement and obtaining acknowledgement information from the acknowledgement (box 83); in response to determining that the at least one SR resource is unused and that at least one channel quality indicator (CQI) resource of the at least one additional resource such as a DNA resource is used, determining that the transmission comprises a CQI (or CQI+ACK/NACK) and obtaining CQI (or CQI+ACK/NACK) information from the CQI (box 84); in response to determining that the at least one SR resource is used, determining that the transmission comprises a SR (box 85); in response to determining that the at least one SR resource is used by an acknowledgement, determining that the transmission comprises a SR and obtaining acknowledgement information from the acknowledgement (box 86); and responding accordingly to the determination(s) and/or obtained information (box 87).

A method as above, wherein a periodic CQI transmission and a periodic SR transmission are configured into different sub-frames. A method as in any above, wherein the transmission is received on a PUCCH. A method as in any above, wherein the transmission is received on an UL. A method as in any above, wherein if received the acknowledgement comprises an unmodulated sequence 1, BPSK/QPSK-modulated sequence 2. A method as in any above, wherein the method is implemented by a base station or network element. A method as in any above, wherein the method is implemented within a wireless communication network. A method as in any above, wherein the method is implemented within an E-UTRAN. A method as in any above, wherein the method is implemented by a computer program. A method as in any above, wherein the method is implemented by a processor of a network element.

In another non-limiting, exemplary embodiment, a computer program product comprises program instructions embodied on a tangible computer-readable medium. Execution of the program instructions results in operations comprising: receiving a transmission comprising at least one scheduling request (SR) resource and at least one additional resource which may be a data-non-associated (DNA) resource, such as ACK/NACK PUCCH or CQI PUCCH; in response to determining that the at least one SR resource is unused, determining that the transmission does not comprise a SR; in response to determining that the at least one SR resource is unused and that at least one acknowledgement resource of the at least one additional resource such as a DNA resource is used, determining that the transmission comprises an acknowledgement and obtaining acknowledgement information from the acknowledgement; in response to determining that the at least one SR resource is unused and that at least one channel quality indicator (CQI) resource of the at least one additional resource such as a DNA resource is used, determining that the transmission comprises a CQI and obtaining CQI information from the CQI; in response to determining that the at least one SR resource is used, determining that the transmission comprises a SR; in response to determining that the at least one SR resource is used by an acknowledgement, determining that the transmission comprises a SR and obtaining acknowledgement information from the acknowledgement; and responding accordingly to the determination(s) and/or obtained information.

A computer program as above, wherein a periodic CQI transmission and a periodic SR transmission are configured into different sub-frames. A computer program as in any above, wherein the transmission is received on a PUCCH. A computer program as in any above, wherein the transmission is received on an UL. A computer program as in any above, wherein if received the acknowledgement comprises an unmodulated sequence 1, BPSK/QPSK-modulated sequence 2. A computer program as in any above, wherein the method is implemented by a base station or network element. A computer program as in any above, wherein the computer program is implemented within a wireless communication network. A computer program as in any above, wherein the computer program is implemented within an E-UTRAN.

In another non-limiting, exemplary embodiment, an apparatus comprising: a receiver configured to receive a transmission comprising at least one scheduling request (SR) resource and at least one additional resource which may be a data-non-associated (DNA) resource, such as ACK/NACK PUCCH or CQI PUCCH; and a processor configured, in response to determining that the at least one SR resource is unused, to determine that the transmission does not comprise a SR, in response to determining that the at least one SR resource is unused and that at least one acknowledgement resource of the at least one additional resource such as a DNA resource is used, to determine that the transmission comprises an acknowledgement and to obtain acknowledgement information from the acknowledgement, in response to determining that the at least one SR resource is unused and that at least one channel quality indicator (CQI) resource of the at least one DNA resource is used, to determine that the transmission comprises a CQI and to obtain CQI information from the CQI, in response to determining that the at least one SR resource is used, to determine that the transmission comprises a SR, in response to determining that the at least one SR resource is used by an acknowledgement, to determine that the transmission comprises a SR and to obtain acknowledgement information from the acknowledgement, and to respond accordingly to the determination(s) and/or obtained information.

An apparatus as above, wherein a periodic CQI transmission and a periodic SR transmission are configured by the processor into different sub-frames. An apparatus as in any above, wherein transmissions are received by the receiver on a PUCCH. An apparatus as in any above, wherein transmissions are received by the receiver on an UL. An apparatus as in any above, wherein if received by the receiver the acknowledgement comprises an unmodulated sequence 1, BPSK/QPSK-modulated sequence 2. An apparatus as in any above, wherein the apparatus comprises a base station or network element. An apparatus as in any above, wherein the apparatus comprises a node of a wireless communication network. An apparatus as in any above, wherein the apparatus comprises a node of an E-UTRAN.

In another non-limiting, exemplary embodiment, an apparatus comprising: means for receiving a transmission comprising at least one scheduling request (SR) resource and at least one additional resource which may be a data-non-associated (DNA) resource, such as ACK/NACK PUCCH or CQI PUCCH; means for determining, in response to determining that the at least one SR resource is unused, that the transmission does not comprise a SR, means for determining, in response to determining that the at least one SR resource is unused and that at least one acknowledgement resource of the at least one additional resource such as a DNA resource is used, that the transmission comprises an acknowledgement and to obtain acknowledgement information from the acknowledgement, means for determining, in response to determining that the at least one SR resource is unused and that at least one channel quality indicator (CQI) resource of the at least one additional resource such as a DNA resource is used, that the transmission comprises a CQI and to obtain CQI information from the CQI, means for determining, in response to determining that the at least one SR resource is used, that the transmission comprises a SR; means for determining, in response to determining that the at least one SR resource is used by an acknowledgement, that the transmission comprises a SR and to obtain acknowledgement information from the acknowledgement, and means for responding accordingly to the determination(s) and/or obtained information.

An apparatus as above, wherein the means for receiving comprises a receiver and the means for determining/obtaining and the means for responding comprise a processor.

Figure 9A:
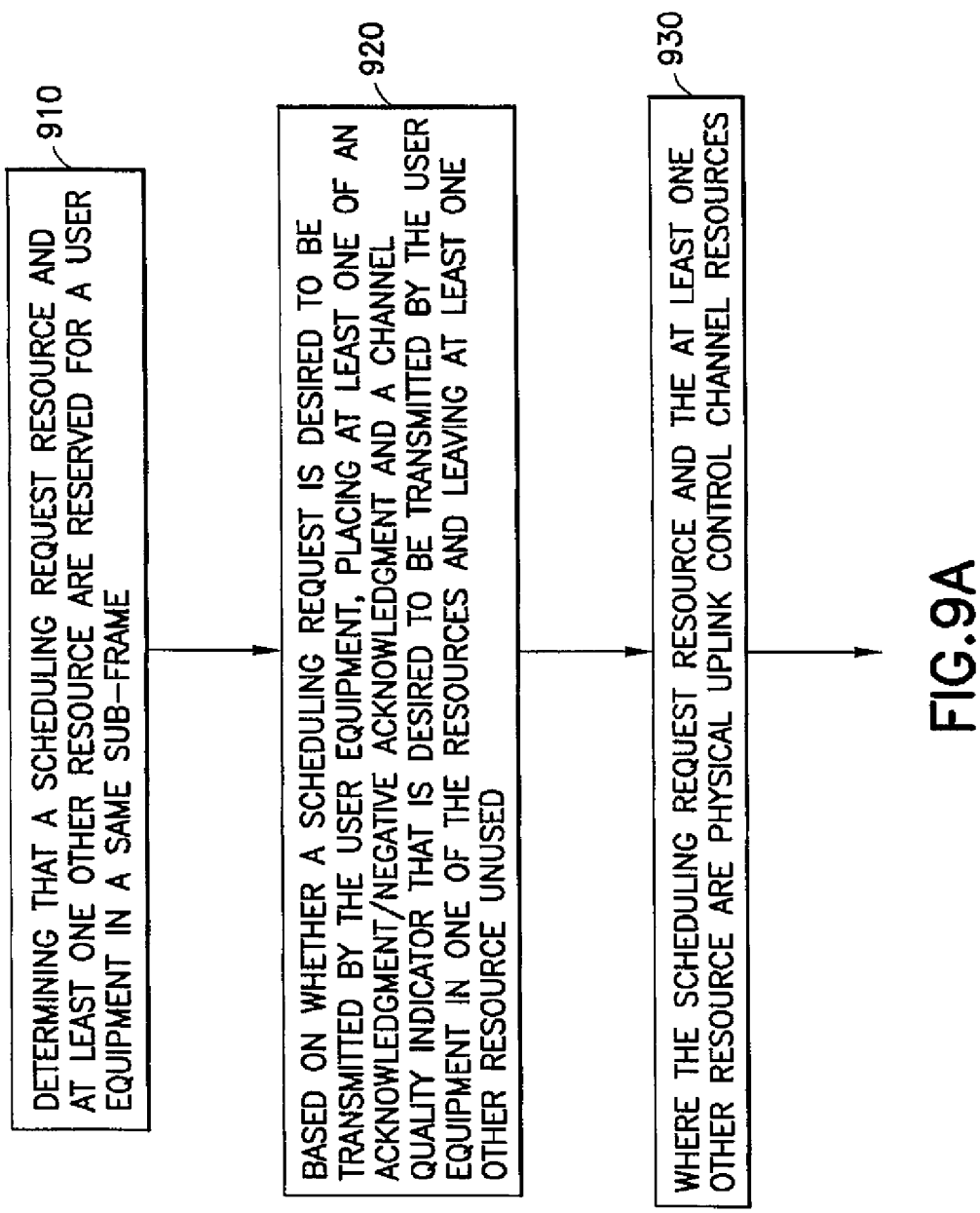
FIGS. 9 A, B, and C, depicts a flowchart illustrating yet another example of a method for practicing the exemplary embodiments of the invention.
Figure 9C:
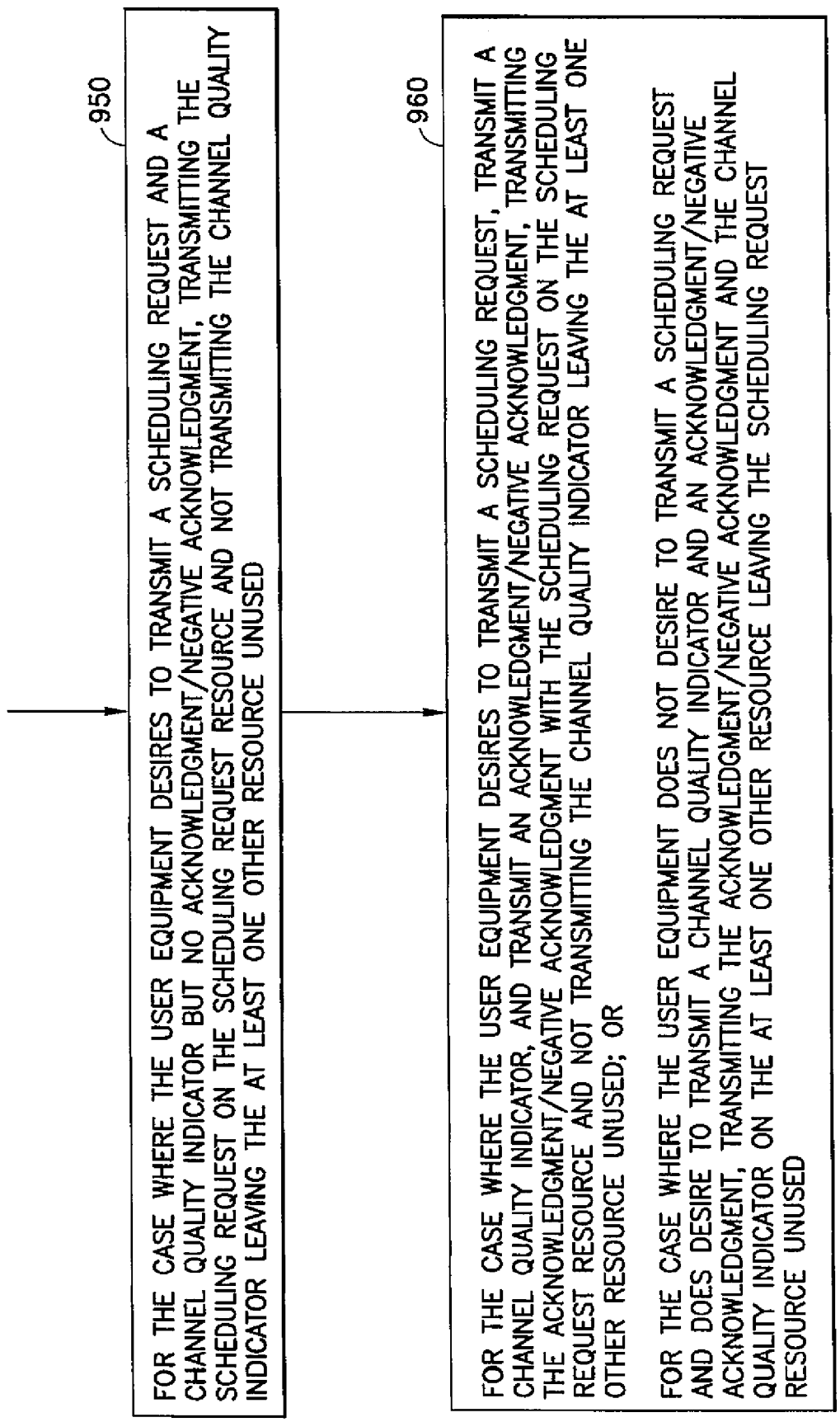

In accordance with the exemplary embodiments of the invention, and as illustrated in FIGS. 9A, 9B, and 9C, there is a method, executable computer program, and apparatus configured for operations determining that a scheduling request resource and at least one other resource are reserved for a user equipment in a same sub-frame (box 910); and based on whether a scheduling request is desired to be transmitted by the user equipment, placing at least one of an acknowledgment/negative acknowledgement and a channel quality indicator that is desired to be transmitted by the user equipment in one of the resources and leaving at least one other resource unused (box 920). The method, executable computer program, and apparatus as above where the scheduling request resource and the at least one other resource are physical uplink control channel resources (box 930). Further, as method as in any of the above comprising for the case where the user equipment desires to transmit a scheduling request and transmit an acknowledgment/negative acknowledgement, transmitting the acknowledgment/negative acknowledgement with the scheduling request on the scheduling request resource and leaving the at least one other resource unused, or for the case where the user equipment does not desire to transmit a scheduling request and does desire to transmit an acknowledgment/negative acknowledgement, transmitting the acknowledgment/negative acknowledgement on the at least one other resource and leaving the scheduling request resource unused (box 940). The method, executable computer program, and apparatus as above for the case where the user equipment desires to transmit a scheduling request and a channel quality indicator but no acknowledgment/negative acknowledgement, transmitting the scheduling request on the scheduling request resource, not transmitting the channel quality indicator, and leaving the at least one other resource unused (box 950). Further, The method, executable computer program, and apparatus as above for the case where the user equipment desires to transmit a scheduling request, transmit a channel quality indicator, and transmit an acknowledgment/negative acknowledgement, transmitting the acknowledgment/negative acknowledgement with the scheduling request on the scheduling request resource, not transmitting the channel quality indicator, and leaving the at least one other resource unused, or for the case where the user equipment does not desire to transmit a scheduling request and does desire to transmit a channel quality indicator and an acknowledgment/negative acknowledgement, transmitting the acknowledgment/negative acknowledgement and the channel quality indicator on the at least one other resource and leaving the scheduling request resource unused (box 960).

The method, executable computer program, and apparatus as above where the scheduling request information is conveyed based on a selected physical uplink control channel selection.

Further in accordance with the exemplary embodiments of the invention there is a method, executable computer program, and apparatus configured for operations comprising determining the PUCCH resource to be used in the case where at least one of two resources, ACK/NACK resource (ACK/NACK PUCCH) and CQI resource (CQI PUCCH) are reserved by the same UE in the same sub-frame with the scheduling request resource (SR PUCCH). The method, executable computer program, and apparatus as above operational for the case where there is a positive scheduling request, transmitting the acknowledgment with the scheduling request on the scheduling request resource (SR PUCCH) and leaving ACK/NACK PUCCH resource unused and, for the case where there is a negative scheduling request, transmitting the acknowledgment (ACK/NACK) on the original ACK/NACK resource (ACK/NACK PUCCH) and leaving SR PUCCH resource unused. The method, executable computer program, and apparatus as above for a case where a channel quality indicator is also to be sent and the corresponding CQI PUCCH resource is being reserved, and for the case of positive scheduling request with CQI but without ACK/NACK, transmitting the scheduling request on the SR PUCCH resource and not transmitting the channel quality indicator (CQI PUCCH resource is unused), and for the case of positive scheduling request with CQI and ACK/NACK, transmitting ACK/NACK on the scheduling request resource (SR PUCCH) and not transmitting the channel quality indicator at all (CQI PUCCH and ACK/NACK PUCCH resources are left unused), and for the case of negative scheduling request, transmitting the channel quality indicator and possible ACK/NACK on the original CQI PUCCH resource. The method, executable computer program, and apparatus as above where the scheduling request information is conveyed based on selected PUCCH resource.

While the exemplary embodiments have been described above in the context of the E-UTRAN (UTRAN-LTE) system, it should be appreciated that the exemplary embodiments of this invention are not limited for use with only this one particular type of wireless communication system, and that they may be used to advantage in other wireless communication systems.

The exemplary embodiments of the invention, as discussed above and as particularly described with respect to exemplary methods, may be implemented as a computer program product comprising program instructions embodied on a tangible computer-readable medium. Execution of the program instructions results in operations comprising steps of utilizing the exemplary embodiments or steps of the method.

It should be noted that the terms "connected," "coupled," or any variant thereof, mean any connection or coupling, either direct or indirect, between two or more elements, and may encompass the presence of one or more intermediate elements between two elements that are "connected" or "coupled" together. The coupling or connection between the elements can be physical, logical, or a combination thereof. As employed herein two elements may be considered to be "connected" or "coupled" together by the use of one or more wires, cables and/or printed electrical connections, as well as by the use of electromagnetic energy, such as electromagnetic energy having wavelengths in the radio frequency region, the microwave region and the optical (both visible and invisible) region, as several non-limiting and non-exhaustive examples.

In general, the various embodiments may be implemented in hardware or special purpose circuits, software, logic or any combination thereof. For example, some aspects may be implemented in hardware, while other aspects may be implemented in firmware or software which may be executed by a controller, microprocessor or other computing device, although the invention is not limited thereto. While various aspects of the invention may be illustrated and described as block diagrams, flow charts, or using some other pictorial representation, it is well understood that these blocks, apparatus, systems, techniques or methods described herein may be implemented in, as non-limiting examples, hardware, software, firmware, special purpose circuits or logic, general purpose hardware or controller or other computing devices, or some combination thereof.

Embodiments of the inventions may be practiced in various components such as integrated circuit modules. The design of integrated circuits is by and large a highly automated process. Complex and powerful software tools are available for converting a logic level design into a semiconductor circuit design ready to be etched and formed on a semiconductor substrate.

Programs, such as those provided by Synopsys, Inc. of Mountain View, Calif. and Cadence Design, of San Jose, Calif. automatically route conductors and locate components on a semiconductor chip using well established rules of design as well as libraries of pre-stored design modules. Once the design for a semiconductor circuit has been completed, the resultant design, in a standardized electronic format (e.g., Opus, GDSII, or the like) may be transmitted to a semiconductor fabrication facility or "fab" for fabrication.

The foregoing description has provided by way of exemplary and non-limiting examples a full and informative description of the invention. However, various modifications and adaptations may become apparent to those skilled in the relevant arts in view of the foregoing description, when read in conjunction with the accompanying drawings and the appended claims. However, all such and similar modifications of the teachings of this invention will still fall within the scope of this invention.

Furthermore, some of the features of the preferred embodiments of this invention could be used to advantage without the corresponding use of other features. As such, the foregoing description should be considered as merely illustrative of the principles of the invention, and not in limitation thereof.

What is claimed is:

1. A method comprising:
   determining that an acknowledgment is to be sent on a physical uplink control channel, where transmission of the acknowledgement on the physical uplink control channel comprises an unmodulated sequence in addition to the acknowledgement data; and
   for a case where there is also a scheduling request to be sent, combining the acknowledgment with the scheduling request on a scheduling resource,
   else placing the acknowledgment in another resource.

2. The method of claim 1, comprising:
   for the case where there is also the scheduling request to be sent, transmitting the acknowledgment with the scheduling request on the scheduling resource.

3. The method of claim 1, comprising:
   for a case where a channel quality indicator is also to be sent, the channel quality indicator is not sent and the another resource is unused.

4. The method of claim 1, where the another resource is a data-non-associated resource.

5. The method of claim 2, where the transmitting is on a physical uplink control channel.

6. The method of claim 2, where the transmitting is on an uplink.

7. The method of claim 1, where the unmodulated sequence comprises reference signals and the acknowledgement data comprises a BPSK/QPSK modulated sequence.

8. The method of claim 1 implemented in a wireless communications network.

9. The method of claim 1 implemented in an evolved universal terrestrial radio access network.

10. A non-transitory computer readable medium encoded with a computer program executable by a processor to perform actions comprising:
    determining that an acknowledgment is to be sent on a physical uplink control channel, where transmission of the acknowledgement on the physical uplink control channel comprises an unmodulated sequence in addition to the acknowledgement data; and
    for a case where there is also a scheduling request to be sent, combining the acknowledgment with the scheduling request on a scheduling resource,
    else placing the acknowledgment in another resource.

11. The non-transitory computer readable medium encoded with a computer program of claim 10, comprising:
    for the case where there is also the scheduling request to be sent, transmitting the acknowledgment with the scheduling request on the scheduling resource.

12. The non-transitory computer readable medium encoded with a computer program of claim 10, comprising:
    for a case where a channel quality indicator is also to be sent, the channel quality indicator is not sent and the another resource is unused.

13. The non-transitory computer readable medium encoded with a computer program of claim 10, where the another resource is a data-non-associated resource.

14. An apparatus comprising:
    at least one processor; and
    at least one memory including computer program code, where the at least one memory and the computer program code are configured, with the at least one processor, to cause the apparatus to at least:
    determine that an acknowledgment is to be sent on a physical link control channel where transmission of the acknowledgement on the physical uplink control channel comprises an unmodulated sequence in addition to the acknowledgement data; and
    for a case where there is also a scheduling request to be sent, combine the acknowledgment with the scheduling request on a scheduling resource,
    else placing the acknowledgment in another resource.

15. The apparatus of claim 14,
    where the at least one memory including the computer program code is configured with the at least one processor to cause the apparatus, for the case where there is also the scheduling request to be sent, to transmit the acknowledgment with the scheduling request on the scheduling resource.

16. The apparatus of claim 14,
    where the at least one memory including the computer program code is configured with the at least one processor to cause the apparatus, for a case where a channel quality indicator is also to be sent, to drop the channel quality indicator such that it is not sent and the another resource is unused.

17. The apparatus of claim 14, where the another resource is a data-non-associated resource.

18. The apparatus of claim 15, where the acknowledgment with the scheduling request is transmitted on a physical uplink control channel.

19. The apparatus of claim 15, where the transmitter is configured to transmit the acknowledgment with the scheduling request on an uplink.

20. The apparatus of claim 14, where the unmodulated sequence comprises reference signals and the acknowledgement data comprises a BPSK/QPSK modulated sequence.

21. The apparatus of claim 14, embodied in a user equipment.

22. The apparatus of claim 14, configured to operate in a wireless communications network.

23. The apparatus of claim 14 configured to operate in an evolved universal terrestrial radio access network.

24. A method comprising:
    receiving information on a scheduling resource on a physical uplink control channel; and
    determining that the information received on the scheduling resource comprises an acknowledgment transmission, where the acknowledgement transmission comprises an unmodulated sequence in addition to acknowledgement data, and where the acknowledgment transmission is communicated on the scheduling resource if there is also a scheduling request combined with the acknowledgment transmission on the scheduling resource, else the acknowledgment transmission is communicated on another resource.

25. The method of claim 24, comprising responding accordingly to the determining that the information received on the scheduling resource comprises the acknowledgment.

26. The method of claim 24 where the information is received from a wireless communications network.

27. The method of claim 24 where the information is received from an evolved universal terrestrial radio access network.

28. A non-transitory computer readable medium encoded with a computer program executable by a processor to perform actions comprising:
   receiving information on a scheduling resource on a physical uplink control channel; and
   determining that the information received on the scheduling resource comprises an acknowledgment transmission, where the transmission comprises an unmodulated sequence in addition to acknowledgement data, and where the acknowledgment transmission is communicated on the scheduling resource if there is also a scheduling request combined with the acknowledgment transmission on the scheduling resource, else the acknowledgment transmission is communicated on another resource.

29. The non-transitory computer readable medium encoded with a computer program of claim 28, comprising
   responding accordingly to the determining that the information received on the scheduling resource comprises the acknowledgment.

30. An apparatus comprising:
   at least one processor; and
   at least one memory including computer program code, where the at least one memory and the computer program code are configured, with the at least one processor, to cause the apparatus to at least:
   receive information on a scheduling resource on a physical uplink control channel; and
   determine that the information received on the scheduling resource comprises an acknowledgment data transmission, where the acknowledgement data transmission comprises an unmodulated sequence in addition to acknowledgment data, and where the acknowledgment data transmission is communicated on the scheduling resource if there is also a scheduling request combined with the acknowledgment data transmission on the scheduling resource, else the acknowledgment data transmission is communicated on another resource.

31. The apparatus of claim 30, where the at least one memory including the computer program code is configured with the at least one processor to cause the apparatus to respond accordingly to the determining that the information received on the scheduling resource comprises the acknowledgment data transmission.

32. The apparatus of claim 30 where the at least one memory including the computer program code is configured with the at least one processor to cause the apparatus to receive the information from a wireless communications network.

33. The apparatus of claim 30 where the at least one memory including the computer program code is configured with the at least one processor to cause the apparatus to receive the information from an evolved universal terrestrial radio access network.

34. A method comprising:
   determining that a scheduling request resource and at least one other resource are reserved for a user equipment in a same sub-frame; and
   based on whether a scheduling request is desired to be transmitted by the user equipment, placing at least one of an acknowledgment/negative acknowledgement and a channel quality indicator that is desired to be transmitted by the user equipment in one of the resources and leaving at least one other resource unused, where the transmission is to comprise an unmodulated sequence in addition to the acknowledgement data.

35. The method of claim 34, where the scheduling request resource and the at least one other resource are physical uplink control channel resources.

36. The method of claim 34 comprising:
   for a case where the user equipment desires to transmit a scheduling request and transmit an acknowledgment/negative acknowledgement, transmitting the acknowledgment/negative acknowledgement with the scheduling request on the scheduling request resource and leaving the at least one other resource unused; or
   for a case where the user equipment does not desire to transmit a scheduling request and does desire to transmit an acknowledgment/negative acknowledgement, transmitting the acknowledgment/negative acknowledgement on the at least one other resource and leaving the scheduling request resource unused.

37. The method of claim 34 comprising:
   for a case where the user equipment desires to transmit a scheduling request and a channel quality indicator but no acknowledgment/negative acknowledgement, transmitting the scheduling request on the scheduling request resource and not transmitting the channel quality indicator leaving the at least one other resource unused.

38. The method of claim 34 comprising:
   for a case where the user equipment desires to transmit a scheduling request, transmit a channel quality indicator, and transmit an acknowledgment/negative acknowledgement, transmitting the acknowledgment/negative acknowledgement with the scheduling request on the scheduling request resource and not transmitting the channel quality indicator leaving the at least one other resource unused; or
   for a case where the user equipment does not desire to transmit a scheduling request and does desire to transmit a channel quality indicator and an acknowledgment/negative acknowledgement, transmitting the acknowledgment/negative acknowledgement and the channel quality indicator on the at least one other resource and leaving the scheduling request resource unused.

39. The method of claim 34, where the scheduling request information is conveyed based on a selected physical uplink control channel selection.

40. A method comprising:
   determining that an acknowledgment transmission is to be sent; and
   for a case where there is also a scheduling request to be sent, transmitting the acknowledgment data with the scheduling request on a scheduling resource in an uplink, where there is no need to specify a separate modulation or multiplexing operation used for transmission of the acknowledgement data with the scheduling request, from a modulation or multiplexing operation used for transmission of the acknowledgement on another resource.

41. The method of claim 40, comprising: transmitting the acknowledgment with the scheduling request on the scheduling resource.

42. The method of claim 41, where the transmitting is on a physical uplink control channel.

43. An apparatus comprising:
   at least one processor; and
   at least one memory including computer program code, where the at least one memory and the computer program code are configured, with the at least one processor, to cause the apparatus to at least:
   determine that an acknowledgment transmission is to be sent; and
   for a case where there is also a scheduling request to be sent, transmit the acknowledgment with the scheduling request on a scheduling resource in an uplink, where there is no need to specify a separate modulation or multiplexing operation used for transmission of the acknowledgement with the scheduling request, from a modulation or multiplexing operation used for transmission of the acknowledgement on another resource.

44. The apparatus of claim 43, where the at least one memory including the computer program code is configured with the at least one processor to cause the apparatus to transmit the acknowledgment with the scheduling request on the scheduling resource.

45. The apparatus of claim 43, where the transmitting is on a physical uplink control channel.

* * * * *

UNITED STATES PATENT AND TRADEMARK OFFICE
CERTIFICATE OF CORRECTION

| | |
|---|---|
| PATENT NO. | : 9,148,877 B2 |
| APPLICATION NO. | : 14/051646 |
| DATED | : September 29, 2015 |
| INVENTOR(S) | : Pajukoski et al. |

Page 1 of 1

It is certified that error appears in the above-identified patent and that said Letters Patent is hereby corrected as shown below:

In the Claims

Claim 14, col. 16, line 21 "link" should be deleted and --uplink-- should be inserted.

Signed and Sealed this
Ninth Day of February, 2016

Michelle K. Lee
*Director of the United States Patent and Trademark Office*